United States Patent Office.

ISAAC STRAUB, OF KENTON COUNTY, KENTUCKY, ADMINISTRATOR OF THE ESTATE OF ABRAHAM STRAUB, DECEASED.

*Letters Patent No.* 40,649, *dated November* 17, 1863; *reissue No.* 3,275, *dated January* 19, 1869.

IMPROVED ASPHALTIC CEMENT.

The Schedule referred to in these Letters Patent and making part of the same.

*To all whom it may concern:*

Be it known that ABRAHAM STRAUB, deceased, late of Milton, county of Northumberland, and State of Pennsylvania, invented a new and useful Asphaltum Shale-Rock Cement; and I, ISAAC STRAUB, of Kenton county, Kentucky, administrator of said ABRAHAM STRAUB, do hereby declare that the following is a full, clear, and exact description thereof.

The invention relates to a new cement for roofing, paving, and other purposes.

It consists in a mixture of asphaltum (coal-tar) with a species of limestone, known as shell or shale-rock, which is destitute of quartz and mica, and which, like the asphaltum, is found in considerable quantities in different localities.

These ingredients, when united in a particular manner, hereinafter to be described, possess all the properties of a good cement, which is impenetrable by water, and unaffected by air.

The following is a description of the mode of compounding the new cement.

One part of undistilled or distilled coal-tar is put into a suitable vessel, to which is added one part, or thereabouts, of finely-pulverized shale-rock, which should be thoroughly freed from moisture previously to introducing it into the coal-tar; and when required for sidewalk-paving, road-making, and other purposes, can be used in this condition.

When hard or rock-like cement is wanted, such as for paving-blocks, and other purposes, it may be boiled. The boiling of the two ingredients is continued until the desired hardness is obtained, which can be determined by taking out a small quantity of the composition, and immersing it in cold water until it is cool; and these ingredients should be well stirred during the boiling-process.

Although I have stated that the two ingredients may be mixed together in equal proportions, the invention is not restricted to any definite quantity of either, as the proportions will vary according to the solidity required for the cement.

In regard to the species of shale-rock to be used—there being a great many varieties of shales—I will state that any fine-grained rock having a slaty structure, which is found in the lias or secondary strata, and which does not contain quartz, gritty matter, or mica, may be used.

I am aware that pure clay has been used with coal-tar to make a cement, and this mixture I do not claim as said ABRAHAM STRAUB'S invention.

The clay above referred to is used before it has undergone any change toward a hard or rocky state, and does not make as good cement, when mixed with the coal-tar, as the substance known as shale-rock, which has undergone this change.

I claim as the invention of the said ABRAHAM STRAUB, deceased—

The within-described cement, when composed of the ingredients, united substantially in the proportions herein specified, for the purpose set forth.

Witness my hand in the matter of my application for a reissue of the patent of ABRAHAM STRAUB for improved composition-cement.

ISAAC STRAUB,
*Administrator of A. Straub, deceased.*

Witnesses:
JAMES H. LAYMAN,
SAM'L KNIGHT.